United States Patent
Shim et al.

(10) Patent No.: US 7,247,126 B2
(45) Date of Patent: Jul. 24, 2007

(54) METHOD AND APPARATUS FOR SHIFT CONTROL OF AN AUTOMATIC TRANSMISSION

(75) Inventors: Hyun Soo Shim, Gwangmyeong (KR); Byeong Wook Jeon, Seoul (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 263 days.

(21) Appl. No.: 11/016,208

(22) Filed: Dec. 17, 2004

(65) Prior Publication Data
US 2005/0137057 A1 Jun. 23, 2005

(30) Foreign Application Priority Data
Dec. 22, 2003 (KR) .................. 10-2003-0094598

(51) Int. Cl.
*F16H 61/00* (2006.01)

(52) U.S. Cl. ............... 477/148; 477/107; 477/109; 477/146; 477/149; 475/123; 475/127; 701/55

(58) Field of Classification Search ......... 477/107, 477/109, 146, 148, 149; 475/123, 127; 701/55
See application file for complete search history.

(56) References Cited

U.S. PATENT DOCUMENTS

| | | | | |
|---|---|---|---|---|
| 5,596,495 A | * | 1/1997 | Brown et al. | 701/51 |
| 5,778,331 A | * | 7/1998 | Leising et al. | 701/66 |
| 6,334,082 B1 | * | 12/2001 | Jeon | 701/55 |
| 6,346,063 B1 | * | 2/2002 | Kondo et al. | 477/143 |

FOREIGN PATENT DOCUMENTS

| | | |
|---|---|---|
| JP | 2001-165295 | 6/2001 |
| KR | 100298776 | 6/2001 |

* cited by examiner

*Primary Examiner*—David D. Le
(74) *Attorney, Agent, or Firm*—Morgan Lewis & Bockius LLP

(57) ABSTRACT

Whenever a 4 to 3 shift condition is satisfied during a 3 to 4 upshift, 4 to 3 shifting is started before the 3 to 4 shifting is finished. The 4 to 3 shifting is executed according to a predetermined hydraulic control pattern. Therefore, responsiveness in shifting is enhanced.

29 Claims, 5 Drawing Sheets

METHOD AND APPARATUS FOR SHIFT CONTROL OF AN AUTOMATIC TRANSMISSION

CROSS-REFERENCE TO RELATED APPLICATIONS

This application claims priority of Korean Application No. 10-2003-0094598, filed on Dec. 22, 2003, the disclosure of which is incorporated herein by reference.

FIELD OF THE INVENTION

Generally, the present invention relates to a method and apparatus for shift control of an automatic transmission. More particularly, the present invention relates to a method and apparatus for shift control of an automatic transmission that may realize a 4 to 3 downshift more promptly and more fluently when such a downshift is required during a 3 to 4 upshifting.

BACKGROUND OF THE INVENTION

As well known in the art, an automatic transmission automatically shifts speeds on the basis of a vehicle driving state and operation of a driver. Such an automatic transmission includes a plurality of frictional elements, such as clutches and brakes, such that multi-speed shifting is realized by hydraulically controlling them.

Throughout the present specification, including the claims, a frictional element that becomes engaged during a shifting is called an on-coming element, and a frictional element that becomes disengaged during a shifting is called an off-going element. In addition, a hydraulic pressure duty rate applied to the on-coming element is called an on-coming pressure duty, and a hydraulic pressure duty rate applied to the off-going element is called an off-going pressure duty.

According to the prior art, when a 4 to 3 downshift condition is satisfied during an execution of a 3 to 4 upshift, e.g., due to an accelerator pedal operation of a driver, a required 4 to 3 downshift is started only after a currently proceeding 3 to 4 upshift is fully finished.

Therefore, according to such a prior art, when a driving condition of a vehicle is rapidly changed such as in the case in which a driver quickly changes an operation of an accelerator pedal, such a request of a driver is not promptly achieved by prompt shifting. That is, responsiveness in shifting does not adequately react to a request of a driver.

Typically, a more prompt achievement of a request of a driver is expected during a 4 to 3 downshift to a 3 to 4 upshifting is requested.

The information disclosed in this Background of the Invention section is only for enhancement of understanding of the background of the invention and should not be taken as an acknowledgement or any form of suggestion that this information forms part of the prior art that is already known in this country to a person of ordinary skill in the art.

SUMMARY OF THE INVENTION

The motivation for the present invention is to provide a method and apparatus for shift control of an automatic transmission having non-limiting advantages of enhanced responsiveness for a 4 to 3 downshifting when a 4 to 3 downshift condition is satisfied during 3 to 4 upshifting.

An exemplary apparatus for shift control of an automatic transmission connected to an engine according to an embodiment of the present invention includes: a throttle opening detector for detecting a throttle valve opening of the engine; an output shaft rotation speed detector for detecting an output shaft rotation speed of the automatic transmission; a turbine speed detector for detecting a turbine speed of the automatic transmission; an input torque detector for detecting an input torque input to the automatic transmission; and a transmission control unit for controlling shifting of the automatic transmission on the basis of signals from the detectors, wherein the transmission control unit performs a method for shift control of an automatic transmission according to the present invention described hereinafter.

An exemplary method for shift control of an automatic transmission according to an embodiment of the present invention includes: determining whether a 4 to 3 shift condition is satisfied during an execution of 3 to 4 shifting; starting the 4 to 3 shifting before the 3 to 4 shifting is finished, when the 4 to 3 shift condition is satisfied during the execution of the 3 to 4 shifting; and executing the started 4 to 3 shifting according to a predetermined hydraulic control pattern.

In a further embodiment, the starting of the 4 to 3 shifting includes: controlling an off-going pressure duty for the 4 to 3 shifting at a predetermined off-going initial hydraulic pressure duty; and controlling an on-coming pressure duty for the 4 to 3 shifting at a predetermined on-coming initial hydraulic pressure duty.

In a still further embodiment, the predetermined off-going initial hydraulic pressure duty is about 38%, and the predetermined on-coming initial hydraulic pressure duty is about 35%.

In another further embodiment, executing of the started 4 to 3 shifting includes: controlling the off-going and on-coming pressure duties such that a turbine speed rebounds and increases up to a local maximum value exceeding a target speed; and controlling the off-going and on-coming pressure duties such that the turbine speed reaches the target speed from the local maximum value.

In a still further embodiment, the controlling of the off-going and on-coming pressure duties such that a turbine speed rebounds and increases up to a local maximum value exceeding a target speed includes at least one increasing control of the off-going pressure duty.

In a still further embodiment, the at least one increasing control of the off-going pressure duty includes an increasing ramp control of the off-going pressure duty.

In another further embodiment, the controlling of the off-going and on-coming pressure duties such that a turbine speed rebounds and increases up to a local maximum value exceeding a target speed includes: determining whether the turbine speed has increased by a first reference speed after rebounding; and abruptly increasing the off-going pressure duty by an off-going map duty calculated based on an output shaft rotation speed and input torque, in the case that the turbine speed has increased by a first reference speed after rebounding. The first reference speed may be set to be about 30 rpm.

In another further embodiment, the controlling of the off-going and on-coming pressure duties such that a turbine speed rebounds and increases up to a local maximum value exceeding a target speed includes: determining whether the turbine speed has reached the target speed within a first predetermined deviation; and abruptly decreasing the off-going pressure duty by a first predetermined rate, in the case that the turbine speed has reached the target speed within the first predetermined deviation.

The first predetermined deviation may be set to be about 40% from the target speed, and the first predetermined rate may be set to be about 2%.

In another further embodiment, the controlling of the off-going and on-coming pressure duties, such that a turbine speed rebounds and increases up to a local maximum value exceeding a target speed, includes: determining whether the turbine speed has reached the target speed within a second predetermined deviation; abruptly increasing the on-coming pressure duty by an on-coming map duty calculated based on an output shaft rotation speed and input torque, in the case that the turbine speed has reached the target speed within the second predetermined deviation; and gradually increasing the on-coming pressure duty at a first predetermined duty-change rate, after the abrupt increasing of the on-coming pressure duty. The second predetermined deviation may be set to be about 15% from the target speed, and the first duty-change rate may be set to be about 10%/sec.

In another further embodiment, the controlling of the off-going and on-coming pressure duties such that a turbine speed rebounds and increases up to a local maximum value exceeding a target speed includes: determining whether the turbine speed has reached the target speed within a second reference speed; abruptly increasing the on-coming pressure duty by a second predetermined rate, in the case that the turbine speed has reached the target speed within the second reference speed; gradually increasing the on-coming pressure duty at a second predetermined duty-change rate, after the abrupt increase of the on-coming pressure duty by the second predetermined rate; and gradually increasing the off-going pressure duty at the second predetermined duty-change rate, after the abrupt increasing of the on-coming pressure duty by the second predetermined rate.

The second reference speed, the second predetermined rate, and the second duty-change rate may be respectively set to be about 30 rpm, about 3%, and about 10%/sec.

In another further embodiment, the controlling of the off-going and on-coming pressure duties such that the turbine speed reaches the target speed from the local maximum value includes: abruptly decreasing the off-going pressure duty by a third predetermined rate, in the case that the turbine speed has reached the local maximum value; gradually decreasing the off-going pressure duty at a third duty-change rate after the abrupt decreasing of the off-going pressure duty by the third predetermined value; and gradually increasing the on-coming pressure duty at a fourth duty-change rate after the abrupt decreasing of the off-going pressure duty by the third predetermined value.

The third predetermined rate, the third duty-change rate, and the fourth duty-change rate may be respectively set to be about 1%, about −10%/sec, and about 30%/sec.

In another further embodiment, the controlling of the off-going and on-coming pressure duties such that the turbine speed reaches the target speed from the local maximum value includes: determining whether the turbine speed has been decreased from the local maximum value by a third reference speed; abruptly decreasing the off-going pressure duty by a fourth predetermined rate, in the case that the turbine speed has been decreased from the local maximum value by the third reference speed; and gradually decreasing the off-going pressure duty at a fifth duty-change rate after the abrupt decreasing of the off-going pressure duty by the fourth predetermined rate. The third reference speed, the fourth predetermined rate, and the fifth duty-change rate may be respectively set to be about 30 rpm, about 10%, and about −20%/sec.

An exemplary method for shift control of an automatic transmission according to the present invention further includes controlling engine torque, the controlling of the engine torque being synchronized with at least one of: the starting of the 4 to 3 shifting; the controlling of the off-going and on-coming pressure duties such that a turbine speed rebounds and increases up to a local maximum value exceeding a target speed; and the controlling of the off-going and on-coming pressure duties such that the turbine speed reaches the target speed from the local maximum value.

In a further embodiment, the controlling of the engine torque includes: reducing the engine torque by a predetermined degree synchronously with the starting of the 4 to 3 shifting; maintaining the reduced engine torque during the controlling of the off-going and on-coming pressure duties such that a turbine speed rebounds and increases up to a local maximum value exceeding a target speed; and gradually recovering the reduced engine torque to a normal torque synchronously with the controlling of the off-going and on-coming pressure duties such that the turbine speed reaches the target speed from the local maximum value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE EMBODIMENTS

An embodiment of the present invention will hereinafter be described in detail with reference to the accompanying drawings.

Figure 1:
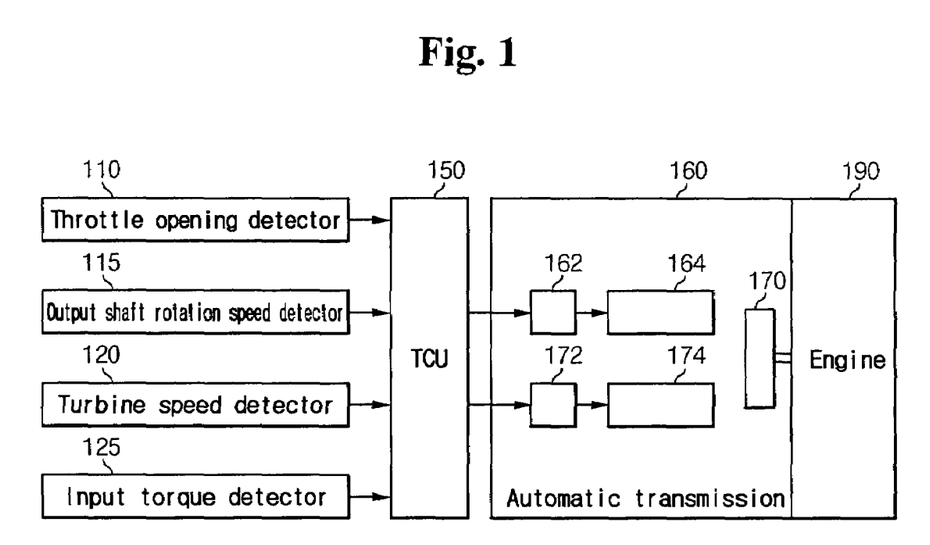
FIG. 1 is a block diagram of an apparatus for shift control of an automatic transmission according to an embodiment of the present invention.

As shown in FIG. 1, an apparatus for shift control of an automatic transmission according to an embodiment of the present invention controls shifting of an automatic transmission 160 connected with an engine 190.

The automatic transmission 160 includes a torque converter 170 that receives torque from the engine 190. The automatic transmission 160 includes an off-going element 164 and an on-coming element 174 for a 4 to 3 downshift. The automatic transmission 160 also includes an off-going side solenoid valve 162 for duty controlling of hydraulic pressure supplied to the off-going element 164 and an on-coming side solenoid valve 172 for duty controlling of hydraulic pressure supplied to the on-coming element 174.

For controlling shifting of the automatic transmission 160, an apparatus for shift control of an automatic transmission according to an embodiment of the present invention includes: a throttle opening detector 110 for detecting a throttle valve opening of the engine 190; an output shaft rotation speed detector 115 for detecting an output shaft rotation speed of the automatic transmission 160; a turbine speed detector 120 for detecting a turbine speed of the torque converter 170; an input torque detector 125 for detecting an input torque input from the torque converter 170; and a transmission control unit (TCU) 150 for controlling shifting of the automatic transmission 160 on the basis of signals from the detectors 110, 115, 120, and 125.

The TCU 150 can be realized by one or more processors activated by a predetermined program, and the predetermined program can be programmed to perform each step of a method according to an embodiment of this invention.

Figure 2:
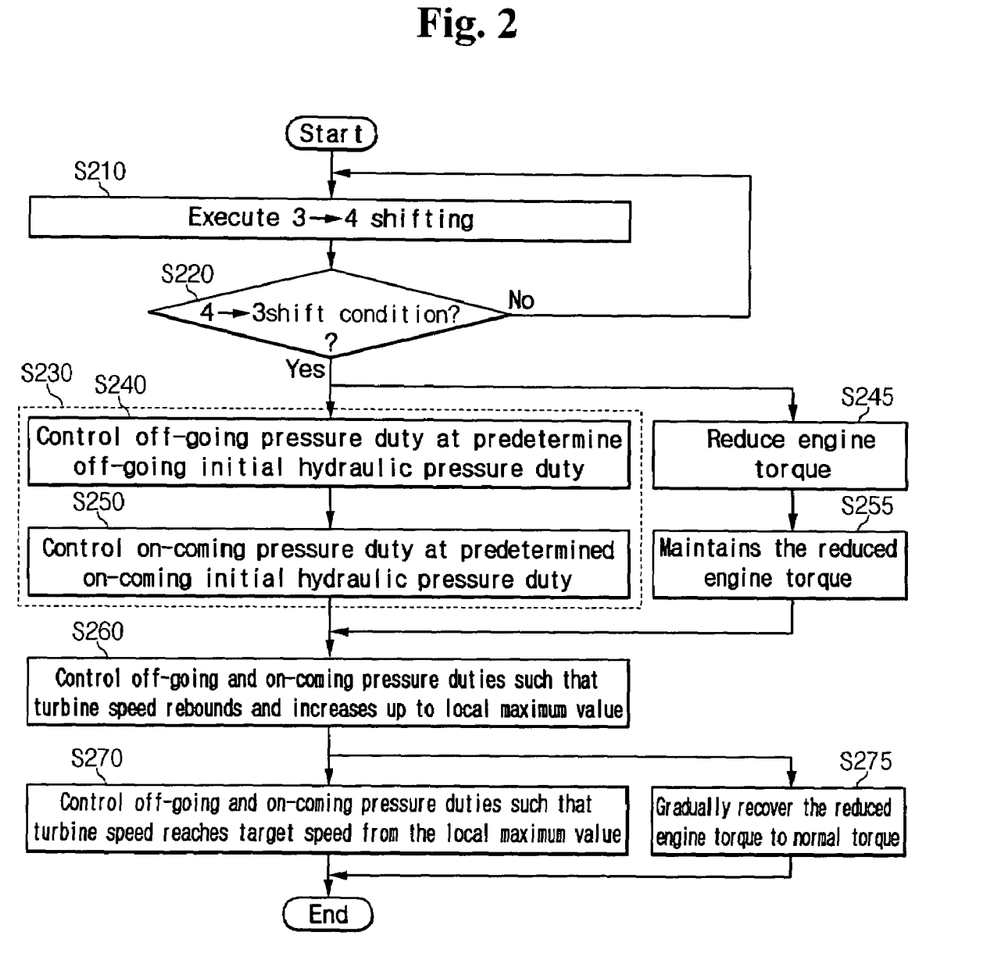
FIG. 2 is a flowchart for showing a method for shift control of an automatic transmission according to an embodiment of the present invention.

A method for shift control of an automatic transmission according to an embodiment of the present invention is hereinafter described in detail with reference to FIG. 2. FIG. 2 is a flowchart showing a method for shift control of an automatic transmission according to an embodiment of the present invention.

Firstly at step S210, the TCU 150 executes a 3 to 4 shifting of the automatic transmission 160 when a predetermined 3 to 4 shift condition is satisfied. During the execution of the 3 to 4 shifting, the TCU 150 determines whether a predetermined 4 to 3 shift condition is satisfied at step S220.

The 4 to 3 shift condition may be preset on the basis of, for example, a throttle valve opening detected by the throttle opening detector 110 and a vehicle speed calculated from an output shaft rotation speed detected by the output shaft rotation speed detector 115. Determining of whether a shift condition is satisfied is obvious to a person of ordinary skill in the art.

In the case that the 4 to 3 shift condition is satisfied during the execution of the 3 to 4 shifting, the TCU 150 starts the 4 to 3 shifting at step S230 before the 3 to 4 shifting is finished. The downshifting may be started as soon as the 4 to 3 shift condition is satisfied.

Figure 5:
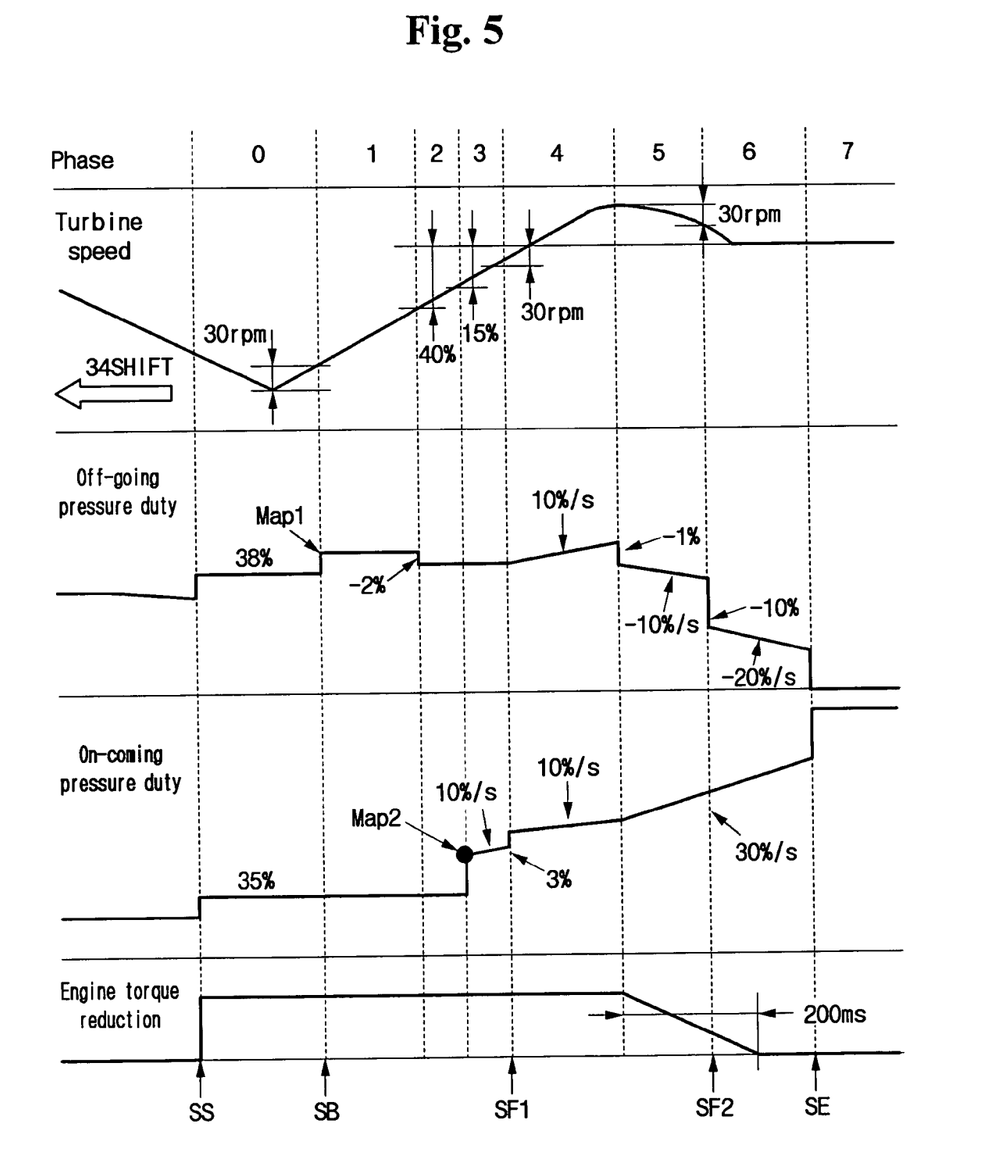
FIG. 5 illustrates an exemplary downshift hydraulic control pattern used in a method for shift control of an automatic transmission according to an embodiment of the present invention.

For the starting of the downshifting, the TCU 150 controls an off-going pressure duty for the 4 to 3 shifting at a predetermined off-going initial hydraulic pressure duty (e.g., 38%) at step S240 and also controls an on-coming pressure duty for the 4 to 3 shifting at a predetermined on-coming initial hydraulic pressure duty (e.g., 35%) at step S250. That is, as shown in FIG. 5, when the 4 to 3 shift condition is satisfied during the 3 to 4 shifting (refer to SS point), the TCU 150 immediately sets the off-going pressure duty to the off-going initial hydraulic pressure duty, and at the same time, sets the on-coming pressure duty to the on-coming initial hydraulic pressure duty. This moment defines the starting of a 0th phase of the 4 to 3 shifting.

When the 4 to 3 shifting is started, the TCU 150 executes the started 4 to 3 shifting according to a predetermined hydraulic control pattern (refer to FIG. 5) through steps S260 and S270. At the step S260, the TCU 150 controls the off-going and on-coming pressure duties such that a turbine speed rebounds and increases up to a local maximum value exceeding a target speed. Then at the step S270, the TCU 150 controls the off-going and on-coming pressure duties such that the turbine speed reaches the target speed from the local maximum value.

According to an embodiment of the present invention, an engine torque of the engine 190 is controlled synchronously with at least one of the steps S230, S260, and S270 (refer to steps S245, S255, and S275, and also to a graph of engine torque reduction in FIG. 5).

In more detail, according to an embodiment of the present invention, firstly at step S245, the TCU 150 reduces the engine torque by a predetermined degree synchronously with the starting of the 4 to 3 shifting. Then at step S255, the TCU 150 maintains the reduced engine torque during the step S260 for the controlling of the off-going and on-coming pressure duties such that a turbine speed rebounds and increases up to a local maximum value exceeding a target speed. In addition at step S275, the TCU 150 gradually recovers the reduced engine torque to a normal torque synchronously with the step S270 for the controlling of the off-going and on-coming pressure duties such that the turbine speed reaches the target speed from the local maximum value.

Figure 3:
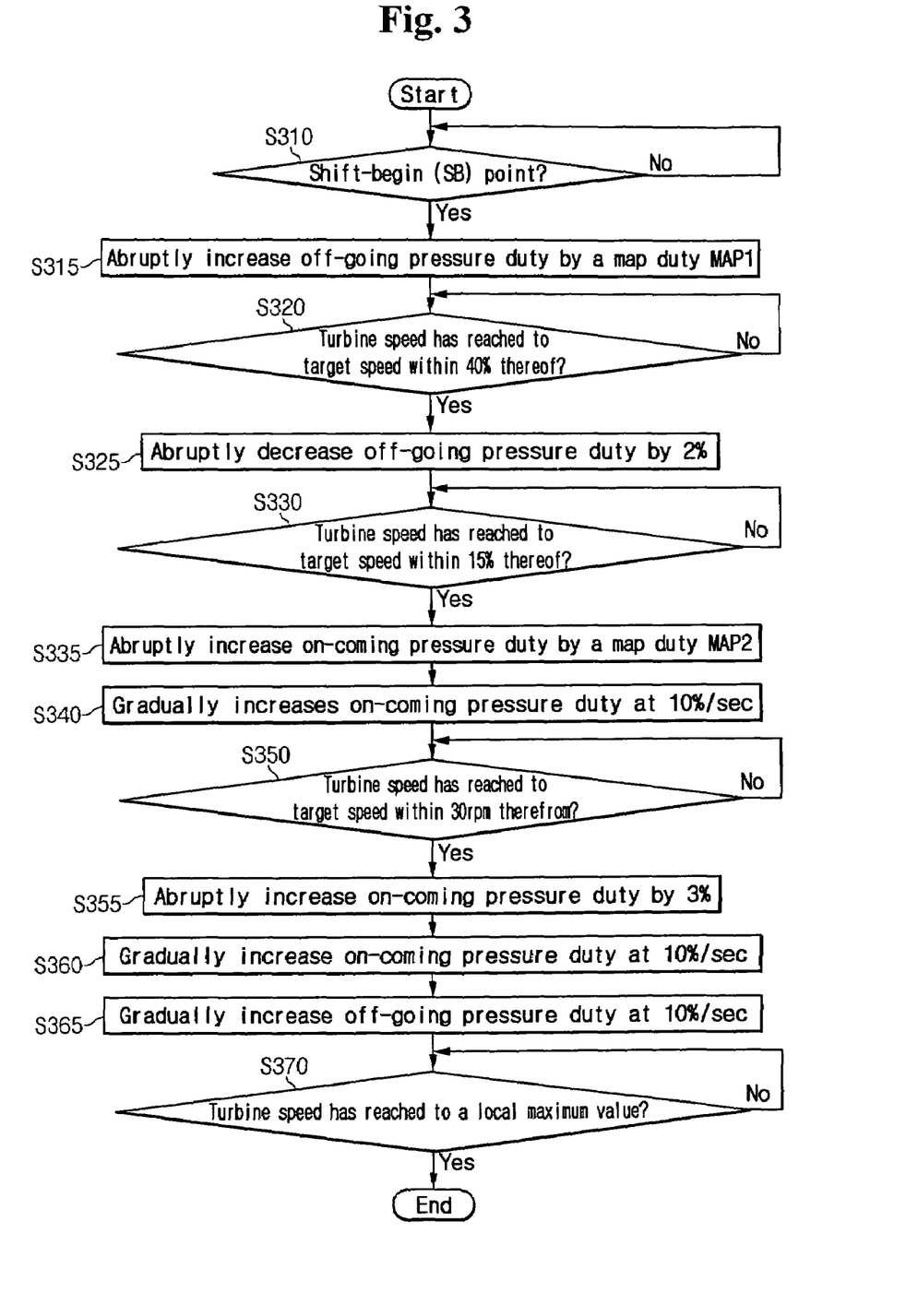
FIG. 3 is a flowchart for showing a detailed process of a step S260 of a method for shift control of an automatic transmission according to an embodiment of the present invention shown in FIG. 2.

Hereinafter, the step S260 for the controlling of the off-going and on-coming pressure duties such that a turbine speed rebounds and increases up to a local maximum value exceeding a target speed is described in detail with reference to FIGS. 3 and 5.

As shown in FIG. 5, the turbine speed is decreasing during the 3 to 4 shifting. If the 4 to 3 shifting is started while the turbine speed is decreasing, that is, if hydraulic pressure duties of the off-going element 164 and the on-coming element 174 are controlled to be respectively at 38% and 35%, the decreasing turbine speed may rebound thereby.

Therefore, the TCU 150 detects the rebound of the turbine speed, and then at step S310, the TCU 150 determines whether the turbine speed has increased by a first reference speed (e.g., 30 rpm) after rebounding.

The step S310 is repeatedly executed until the turbine speed increases by a first reference speed (e.g., 30 rpm) after rebounding. Therefore, a shift-begin (SB) point is detected by the step S310. When the shift-begin point is detected at the step S310, the TCU 150 abruptly increases the off-going pressure duty at step S315 by an off-going map duty MAP1 calculated based on the output shaft rotation speed and the input torque (refer to the 1st phase in FIG. 5).

That is, the amount the off-going pressure duty is increased at the step S315 varies on the output shaft rotation speed and the input torque. For specific automatic transmissions, appropriate values of the off-going map duty MAP1 may be chosen by a person of ordinary skill in the art, referring to specification of the transmissions.

After the turbine speed has rebounded, the TCU 150 determines at step S320 whether the turbine speed has reached to the target speed within a first predetermined deviation (e.g., 40%).

The step S320 is repeatedly executed until the turbine speed reaches the target speed within a first predetermined deviation after rebounding. Therefore, the TCU 150 may confirm a starting of the 2nd phase by the step S320.

In the case that the turbine speed has reached the target speed within the first predetermined deviation, the TCU 150 abruptly decreases the off-going pressure duty by a first predetermined rate (e.g., 2%) at step S325.

While the turbine speed is continuously increasing, the TCU 150 determines, at step S330, whether the turbine speed has reached the target speed within a second predetermined deviation (e.g., 15%). The step S330 is repeatedly executed until the turbine speed reaches the target speed within the second predetermined deviation. Therefore, the TCU 150 may confirm a starting of the 3rd phase by the step S330.

In the case that the turbine speed has reached the target speed within the second predetermined deviation, the TCU 150 abruptly increases the on-coming pressure duty by an on-coming map duty MAP2 calculated based on the output shaft rotation speed and the input torque at step S335. That is, the amount the on-coming pressure duty is increased at the step S335 varies on the output shaft rotation speed and the input torque. For specific automatic transmissions, appropriate values of the on-coming map duty MAP2 may be chosen by a person of ordinary skill in the art, referring to specification of the transmissions.

Subsequently at step S340, the TCU 150 gradually increases the on-coming pressure duty at a first predetermined duty-change rate (10%/sec), after the abrupt increasing of the on-coming pressure duty.

While the turbine speed is continuously increasing, the TCU 150 determines, at step S350, whether the turbine speed has reached the target speed within a second reference speed (e.g., 30 rpm). The step S350 is repeatedly executed until the turbine speed reaches the target speed within the second reference speed. Therefore, the TCU 150 may confirm a starting of the 4th phase by the step S350.

In the case that the turbine speed has reached the target speed within the second reference speed, the TCU 150 abruptly increases the on-coming pressure duty by a second predetermined rate (e.g., 3%) at step S355.

After the abrupt increasing of the on-coming pressure duty by the second predetermined rate, the TCU 150 gradually increases the on-coming pressure duty at a second predetermined duty-change rate (e.g., 10%/sec) at step S360, and also gradually increases the off-going pressure duty at the second predetermined duty-change rate at the step S365.

According to the above-described process, the turbine speed overshoots the target speed and eventually reaches a local maximum value during the 4th phase. Therefore at step S370, the TCU 150 determines whether the turbine speed has reached the local maximum value. The step S370 is repeatedly executed until the turbine speed reaches the local maximum value. Therefore, the TCU 150 may confirm a starting of the 5th phase (i.e., the moment that the turbine speed reaches the local maximum value) by the step S370.

As described above, the step S260 for the controlling of the off-going and on-coming pressure duties such that a turbine speed rebounds and increases up to a local maximum value exceeding a target speed includes at least one increasing control of the off-going pressure duty. Furthermore, the at least one increasing control of the off-going pressure duty includes an increasing ramp control of the off-going pressure duty (refer to the 4th phase).

After the step S260 is finished, the TCU 150 executes the step S270 for the controlling of the off-going and on-coming pressure duties such that the turbine speed reaches the target speed from the local maximum value. Hereinafter, the step S270 is described in further detail with reference to FIGS. 4 and 5.

Figure 4:
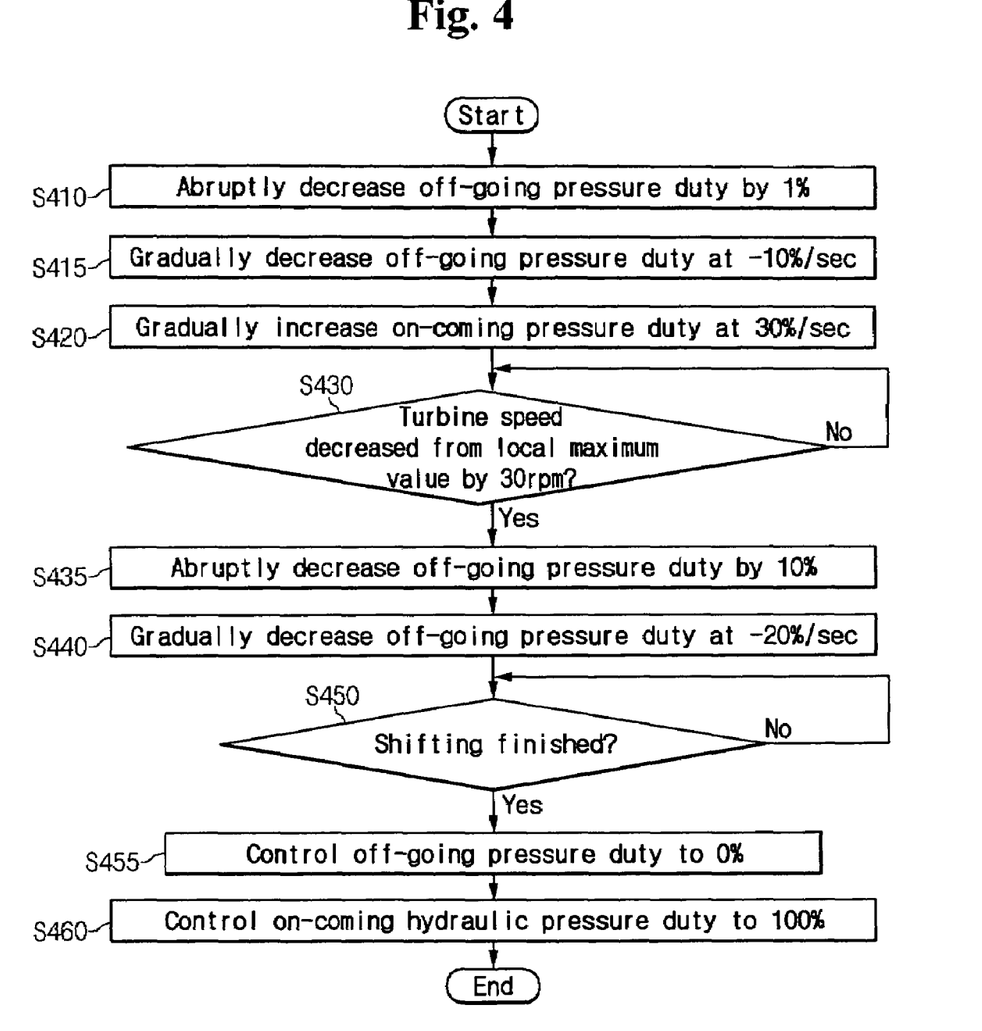
FIG. 4 is a flowchart for showing a detailed process of a step S270 of a method for shift control of an automatic transmission according to an embodiment of the present invention shown in FIG. 2.

In the case that the turbine speed has reached the local maximum value (refer to the step S370), the TCU 150 abruptly decreases the off-going pressure duty by a third predetermined rate (e.g., 1%) at step S410. In addition, as shown in the graph of engine torque reduction in FIG. 5, the TCU 150 gradually releases the torque reduction of the engine synchronously with the step S410, so as to gradually recover the reduced engine torque to a normal torque. Regarding the release speed of the engine torque reduction, the reduced engine torque is controlled to recover to the normal torque, e.g., for about 200 msec.

After the abrupt decreasing of the off-going pressure duty by the third predetermined value, the TCU 150 gradually decreases the off-going pressure duty at a third duty-change rate (e.g., −10%/sec) at step S415, and also gradually increases the on-coming pressure duty at a fourth duty-change rate (e.g., 30%/sec) at step S420.

While the turbine speed is decreasing from the local maximum value to the target speed, the TCU 150 determines, at step S430, whether the turbine speed has been decreased from the local maximum value by a third reference speed (e.g., 30 rpm). The step S430 is repeatedly executed until the turbine speed decreases from the local maximum value by a third reference speed. Therefore, the TCU 150 may confirm a starting of the 6th phase by the step S430.

In the case that the turbine speed decreases from the local maximum value by the third reference speed, the TCU 150 abruptly decreases the off-going pressure duty by a fourth predetermined rate (e.g., 10%) at step S435, and then gradually decreases the off-going pressure duty at a fifth duty-change rate (e.g., −20%/sec) at step S440. According to the above steps S435 and S440, the turbine speed eventually reaches the target speed. Therefore at step S450, the TCU 150 determines whether the 4 to 3 shifting is finished. The finishing of the 4 to 3 shifting is determined on the basis of whether the turbine speed has reached the target speed. In the case that the 4 to 3 shifting is finished, the TCU 150 finishes the shift control by controlling the off-going pressure duty to 0% at step S455, and controlling the on-coming hydraulic pressure duty to 100% at step S460.

The steps S455 and S460 may be executed as soon as the turbine speed reaches the target speed, or they may be executed some period after reaching the target speed, in order for the on-coming element to become stably engaged.

According to an embodiment of the present invention, even if an automatic transmission is under a 3 to 4 upshift, 4 to 3 downshift may be immediately executed when such a downshift is needed. Therefore, responsiveness in shifting of an automatic transmission is enhanced.

Furthermore, shift quality of a downshift starting during an upshifting is promised by such a hydraulic control of an embodiment of the present invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for shift control of an automatic transmission comprising:
   determining whether a 4 to 3 shift condition is satisfied during an execution of a 3 to 4 shifting;
   starting the 4 to 3 shifting before the 3 to 4 shifting is finished, when the 4 to 3 shift condition is satisfied during the execution of the 3 to 4 shifting; and
   executing the started 4 to 3 shifting according to a predetermined hydraulic control pattern;
   wherein the executing of the started 4 to 3 shifting comprises:
   controlling off-going and on-coming pressure duties such that a turbine speed rebounds and increases up to a local maximum value exceeding a target speed; and controlling the off-going and on-coming pressure duties such that the turbine speed reaches the target speed from the local maximum value, wherein the controlling of the off-going and on-coming pressure duties such that the turbine speed rebounds and increases up to the local maximum value exceeding the target speed comprises:

determining whether the turbine speed has increased by a first reference speed after rebounding;

abruptly increasing the off-going pressure duty by an off-going map duty calculated based on an output shaft rotation speed and an input torque, in the case that the turbine speed has increased by the first reference speed after rebounding;

determining whether the turbine speed has reached the target speed within a first predetermined deviation;

abruptly decreasing the off-going pressure duty by a first predetermined rate, in the case that the turbine speed has reached the target speed within the first predetermined deviation;

determining whether the turbine speed has reached the target speed within a second predetermined deviation;

abruptly increasing the on-coming pressure duty by an on-coming map duty calculated based on the output shaft rotation speed and the input torque, in the case that the turbine speed has reached the target speed within the second predetermined deviation;

gradually increasing the on-coming pressure duty at a first predetermined duty-change rate, after the abrupt increasing of the on-coming pressure duty;

determining whether the turbine speed has reached the target speed within a second reference speed;

abruptly increasing the on-coming pressure duty by a second predetermined rate, in the case that the turbine speed has reached the target speed within the second reference speed;

gradually increasing the on-coming pressure duty at a second predetermined duty-change rate, after the abrupt increasing of the on-coming pressure duty by the second predetermined rate; and gradually increasing the off-going pressure duty at the second predetermined duty-change rate, after the abrupt increasing of the on-coming pressure duty by the second predetermined rate.

2. The method of claim 1, wherein:
the first reference speed is about 30rpm;
the first predetermined deviation is about 40% from the target speed;
the first predetermined rate is about 2%;
the second predetermined deviation is about 15% from the target speed;
the first duty-change rate is about 10%/sec;
the second reference speed is about 30 rpm;
the second predetermined rate is about 3%; and
the second duty-change rate is about 10%/sec.

3. The method of claim 1, wherein the starting of the 4 to 3 shifting comprises:
controlling the off-going pressure duty for the 4 to 3 shifting at a predetermined off-going initial hydraulic pressure duty; and
controlling the on-coming pressure duty for the 4 to 3 shifting at a predetermined on-coming initial hydraulic pressure duty.

4. The method of claim 3, wherein:
the predetermined off-going initial hydraulic pressure duty is about 38%; and
the predetermined on-coming initial hydraulic pressure duty is about 35%.

5. The method of claim 1, wherein the controlling of the off-going and on-coming pressure duties such that the turbine speed rebounds and increases up to the local maximum value exceeding the target speed comprises at least one increasing control of the off-going pressure duty.

6. The method of claim 5, wherein the at least one increasing control of the off-going pressure duty comprises an increasing ramp control of the off-going pressure duty.

7. The method of claim 5, further comprising controlling engine torque, the controlling of the engine torque being synchronized with at least one of:
the starting of the 4 to 3 shifting;
the controlling of the off-going and on-coming pressure duties such that the turbine speed rebounds and increases up to the local maximum value exceeding the target speed; and
the controlling of the off-going and on-coming pressure duties such that the turbine speed reaches the target speed from the local maximum value.

8. The method of claim 7, wherein the controlling of the engine torque comprises:
reducing the engine torque by a predetermined degree synchronously with the starting of the 4 to 3 shifting;
maintaining the reduced engine torque during the controlling of the off-going and on-coming pressure duties such that the turbine speed rebounds and increases up to the local maximum value exceeding the target speed; and
gradually recovering the reduced engine torque to a normal torque synchronously with the controlling of the off-going and on-coming pressure duties such that the turbine speed reaches the target speed from the local maximum value.

9. The method of claim 1, wherein the controlling of the off-going and on-coming pressure duties such that the turbine speed reaches the target speed from the local maximum value comprises:
abruptly decreasing the off-going pressure duty by a third predetermined rate, in the case that the turbine speed has reached the local maximum value;
gradually decreasing the off-going pressure duty at a third duty-change rate after the abrupt decreasing of the off-going pressure duty by the third predetermined value;
gradually increasing the on-coming pressure duty at a fourth duty-change rate after the abrupt decreasing of the off-going pressure duty by the third predetermined value;
determining whether the turbine speed has been decreased from the local maximum value by a third reference speed;
abruptly decreasing the off-going pressure duty by a fourth predetermined rate, in the case that the turbine speed has been decreased from the local maximum value by the third reference speed; and
gradually decreasing the off-going pressure duty at a fifth duty-change rate after the abrupt decreasing of the off-going pressure duty by the fourth predetermined rate.

10. The method of claim 9, wherein:
the third predetermined rate is about 1%;
the third duty-change rate is about −10%/sec;
the fourth duty-change rate is about 30%/sec;
the third reference speed is about 30 rpm;
the fourth predetermined rate is about 10%; and
the fifth duty-change rate is about −20%/sec.

11. The method of claim 9, further comprising controlling engine torque, the controlling of the engine torque being synchronized with at least one of:
- the starting of the 4 to 3 shifting;
- the controlling of the off-going and on-coming pressure duties such that the turbine speed rebounds and increases up to the local maximum value exceeding the target speed; and
- the controlling of the off-going and on-coming pressure duties such that the turbine speed reaches the target speed from the local maximum value.

12. The method of claim 11, wherein the controlling of the engine torque comprises:
- reducing the engine torque by a predetermined degree synchronously with the starting of the 4 to 3 shifting;
- maintaining the reduced engine torque during the controlling of the off-going and on-coming pressure duties such that the turbine speed rebounds and increases up to the local maximum value exceeding the target speed; and
- gradually recovering the reduced engine torque to the normal torque synchronously with the controlling of the off-going and on-coming pressure duties such that the turbine speed reaches the target speed from the local maximum value.

13. The method of claim 1, wherein the controlling of the off-going and on-coming pressure duties such that the turbine speed reaches the target speed from the local maximum value comprises:
- abruptly decreasing the off-going pressure duty by a third predetermined rate, in the case that the turbine speed has reached the local maximum value;
- gradually decreasing the off-going pressure duty at a third duty-change rate after the abrupt decreasing of the off-going pressure duty by the third predetermined value; and
- gradually increasing the on-coming pressure duty at a fourth duty-change rate after the abrupt decreasing of the off-going pressure duty by the third predetermined value.

14. The method of claim 13, wherein:
the third predetermined rate is about 1%;
the third duty-change rate is about −10%/sec; and
the fourth duty-change rate is about 30%/sec.

15. The method of claim 1, wherein the controlling of the off-going and on-coming pressure duties such that the turbine speed reaches the target speed from the local maximum value comprises:
- determining whether the turbine speed has been decreased from the local maximum value by a third reference speed;
- abruptly decreasing the off-going pressure duty by a fourth predetermined rate, in the case that the turbine speed has been decreased from the local maximum value by the third reference speed; and
- gradually decreasing the off-going pressure duty at a fifth duty-change rate after the abrupt decreasing of the off-going pressure duty by the fourth predetermined rate.

16. The method of claim 15, wherein:
the third reference speed is about 30 rpm;
the fourth predetermined rate is about 10%; and
the fifth duty-change rate is about −20%/sec.

17. The method of claim 1, further comprising controlling an engine torque, the controlling of the engine torque being synchronized with at least one of:
- the starting of the 4 to 3 shifting;
- the controlling of the off-going and on-coming pressure duties such that the turbine speed rebounds and increases up to the local maximum value exceeding the target speed; and
- the controlling of the off-going and on-coming pressure duties such that the turbine speed reaches the target speed from the local maximum value.

18. The method of claim 17, wherein the controlling of the engine torque comprises:
- reducing the engine torque by a predetermined degree synchronously with the starting of the 4 to 3 shifting;
- maintaining the reduced engine torque during the controlling of the off-going and on-coming pressure duties such that the turbine speed rebounds and increases up to the local maximum value exceeding the target speed; and
- gradually recovering the reduced engine torque to a normal torque synchronously with the controlling of the off-going and on-coming pressure duties such that the turbine speed reaches the target speed from the local maximum value.

19. The method of claim 1, further comprising controlling engine torque, the controlling of the engine torque being synchronized with at least one of:
- the starting of the 4 to 3 shifting;
- the controlling of the off-going and on-coming pressure duties such that the turbine speed rebounds and increases up to a local maximum value exceeding the target speed; and
- the controlling of the off-going and on-coming pressure duties such that the turbine speed reaches the target speed from the local maximum value.

20. The method of claim 19, wherein the controlling of the engine torque comprises:
- reducing the engine torque by a predetermined degree synchronously with the starting of the 4 to 3 shifting;
- maintaining the reduced engine torque during the controlling of the off-going and on-coming pressure duties such that the turbine speed rebounds and increases up to the local maximum value exceeding a target speed; and
- gradually recovering the reduced engine torque to a normal torque synchronously with the controlling of the off-going and on-coming pressure duties such that the turbine speed reaches the target speed from the local maximum value.

21. An apparatus for shift control of an automatic transmission connected to an engine, the apparatus comprising:
- a throttle opening detector for detecting a throttle valve opening of the engine;
- an output shaft rotation speed detector for detecting an output shaft rotation speed of the automatic transmission;
- a turbine speed detector for detecting a turbine speed of the automatic transmission;
- an input torque detector for detecting a input torque to the automatic transmission; and
- a transmission control unit for controlling shifting of the automatic transmission on the basis of signals from the detectors,
wherein the transmission control unit executes instructions for:
- determining whether a 4 to 3 shift condition is satisfied during an execution of a 3 to 4 shifting;
- starting the 4 to 3 shifting before the 3 to 4 shifting is finished, when the 4 to 3 shift condition is satisfied during the execution of the 3 to 4 shifting; and executing the started 4 to 3 shifting according to a predetermined hydraulic control pattern, wherein the executing of the started 4 to 3 shifting comprises:

controlling off-going and on-coming pressure duties such that the turbine speed rebounds and increases up to a local maximum value exceeding a target speed; and controlling the off-going and on-coming pressure duties such that the turbine speed reaches the target speed from the local maximum value; and wherein the controlling of the off-going and on-coming pressure duties such that the turbine speed rebounds and increases up to the local maximum value exceeding the target speed comprises:

determining whether the turbine speed has increased by a first reference speed after rebounding;

abruptly increasing the off-going pressure duty by an off-going map duty calculated based on the output shaft rotation speed and the input torque, in the case that the turbine speed has increased by the first reference speed after rebounding;

determining whether the turbine speed has reached the target speed within a first predetermined deviation;

abruptly decreasing the off-going pressure duty by a first predetermined rate, in the case that the turbine speed has reached the target speed within the first predetermined deviation;

determining whether the turbine speed has reached the target speed within a second predetermined deviation;

abruptly increasing the on-coming pressure duty by an on-coming map duty calculated based on the output shaft rotation speed and the input torque, in the case that the turbine speed has reached the target speed within the second predetermined deviation;

gradually increasing the on-coming pressure duty at a first predetermined duty-change rate, after the abrupt increasing of the on-coming pressure duty;

determining whether the turbine speed has reached the target speed within a second reference speed;

abruptly increasing the on-coming pressure duty by a second predetermined rate, in the case that the turbine speed has reached the target speed within the second reference speed;

gradually increasing the on-coming pressure duty at a second predetermined duty-change rate, after the abrupt increasing of the on-coming pressure duty by the second predetermined rate; and gradually increasing the off-going pressure duty at the second predetermined duty-change rate, after the abrupt increasing of the on-coming pressure duty by the second predetermined rate.

22. The apparatus of claim 21, wherein the controlling of the off-going and on-coming pressure duties such that the turbine speed rebounds and increases up to the local maximum value exceeding the target speed comprises at least one increasing control of the off-going pressure duty.

23. The apparatus of claim 21, wherein the controlling of the off-going and on-coming pressure duties such that the turbine speed reaches the target speed from the local maximum value comprises:

abruptly decreasing the off-going pressure duty by a third predetermined rate, in the case that the turbine speed has reached the local maximum value;

gradually decreasing the off-going pressure duty at a third duty-change rate after the abrupt decreasing of the off-going pressure duty by the third predetermined value;

gradually increasing the on-coming pressure duty at a fourth duty-change rate after the abrupt decreasing of the off-going pressure duty by the third predetermined value;

determining whether the turbine speed has been decreased from the local maximum value by a third reference speed;

abruptly decreasing the off-going pressure duty by a fourth predetermined rate, in the case that the turbine speed has been decreased from the local maximum value by the third reference speed; and gradually decreasing the off-going pressure duty at a fifth duty-change rate after the abrupt decreasing of the off-going pressure duty by the fourth predetermined rate.

24. The apparatus of claim 21, wherein the controlling of the off-going and on-coming pressure duties such that the turbine speed reaches the target speed from the local maximum value comprises:

abruptly decreasing the off-going pressure duty by a third predetermined rate, in the case that the turbine speed has reached the local maximum value;

gradually decreasing the off-going pressure duty at a third duty-change rate after the abrupt decreasing of the off-going pressure duty by the third predetermined value; and gradually increasing the on-coming pressure duty at a fourth duty-change rate after the abrupt decreasing of the off-going pressure duty by the third predetermined value.

25. The apparatus of claim 21, wherein the controlling of the off-going and on-coming pressure duties such that the turbine speed reaches the target speed from the local maximum value comprises:

determining whether the turbine speed has been decreased from the local maximum value by a third reference speed;

abruptly decreasing the off-going pressure duty by a fourth predetermined rate, in the case that the turbine speed has been decreased from the local maximum value by the third reference speed; and gradually decreasing the off-going pressure duty at a fifth duty-change rate after the abrupt decreasing of the off-going pressure duty by the fourth predetermined rate.

26. The apparatus of claim 21, wherein the starting of the 4 to 3 shifting comprises:

controlling the off-going pressure duty for the 4 to 3 shifting at a predetermined off-going initial hydraulic pressure duty; and controlling the on-coming pressure duty for the 4 to 3 shifting at a predetermined on-coming initial hydraulic pressure duty.

27. The apparatus of claim 26, wherein:

the predetermined off-going initial hydraulic pressure duty is about 38%; and the predetermined on-coming initial hydraulic pressure duty is about 35%.

28. The apparatus of claim 21, further comprising controlling engine torque, the controlling of the engine torque being synchronized with at least one of:

the starting of the 4 to 3 shifting;

the controlling of the off-going and on-coming pressure duties such that the turbine speed rebounds and increases up to the local maximum value exceeding the target speed; and the controlling of the off-going and on-coming pressure duties such that the turbine speed reaches the target speed from the local maximum value.

29. The apparatus of claim 28, wherein the controlling of the engine torque comprises:

reducing the engine torque by a predetermined degree synchronously with the starting of the 4 to 3 shifting;

maintaining the reduced engine torque during the controlling of the off-going and on-coming pressure duties such that the turbine speed rebounds and increases up to the local maximum value exceeding the target speed; and gradually recovering the reduced engine torque to a normal torque synchronously with the controlling of the off-going and on-coming pressure duties such that the turbine speed reaches the target speed from the local maximum value.

\* \* \* \* \*